United States Patent [19]

Rogers et al.

[11] Patent Number: 5,201,224
[45] Date of Patent: Apr. 13, 1993

[54] APPARATUS AND METHOD FOR SENSING UNBALANCE FORCE AND LOCATION THROUGH FREQUENCY MODULATION

[75] Inventors: Steven W. Rogers; Hanford D. Monroe, both of Conway, Ark.

[73] Assignee: FMC Corporation, Chicago, Ill.

[21] Appl. No.: 695,128

[22] Filed: May 3, 1991

[51] Int. Cl.$^5$ .............................................. G01M 1/22
[52] U.S. Cl. ................................................... 73/462
[58] Field of Search ............................... 73/462, 862.59

[56] References Cited

U.S. PATENT DOCUMENTS

| | | | |
|---|---|---|---|
| 3,452,603 | 5/1966 | Kaiser et al. | 73/466 |
| 4,046,017 | 9/1977 | Hill | 73/462 |
| 4,594,898 | 6/1986 | Kirman et al. | 73/862.59 |

Primary Examiner—John E. Chapman
Attorney, Agent, or Firm—H. M. Stanley; R. C. Kamp; R. B. Megley

[57] ABSTRACT

A force sensing apparatus and method in a vehicle wheel balancer is disclosed which in one embodiment includes use of a voltage controlled oscillator connected to drive a piezoelectric crystal at an oscillation frequency which is compared in phase to a frequency generated by the wheel balancer spin shaft encoder. When unbalance force imposed changes occur in the crystal oscillation frequency, an unbalance output is provided by the comparison which contains the unbalance force magnitude and angular orientation information. The unbalance output is processed to provide operator indications for facilitating application of counterweights to the vehicle wheel.

19 Claims, 3 Drawing Sheets

FIG_1
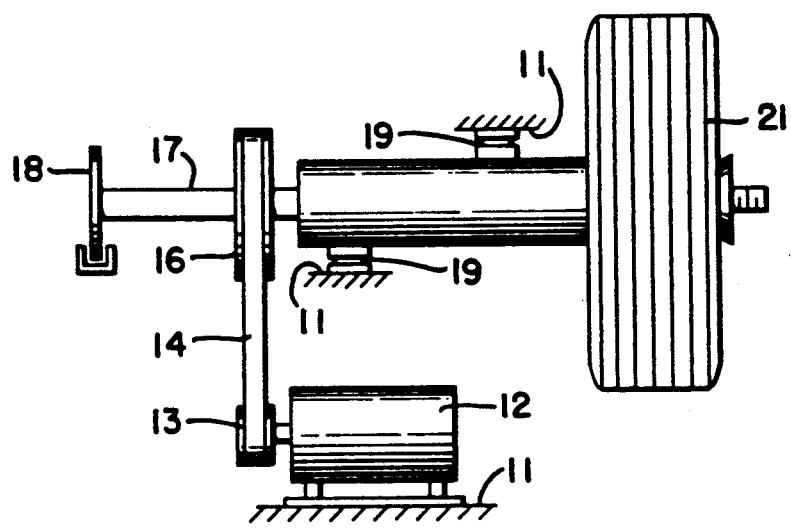
FIG_2
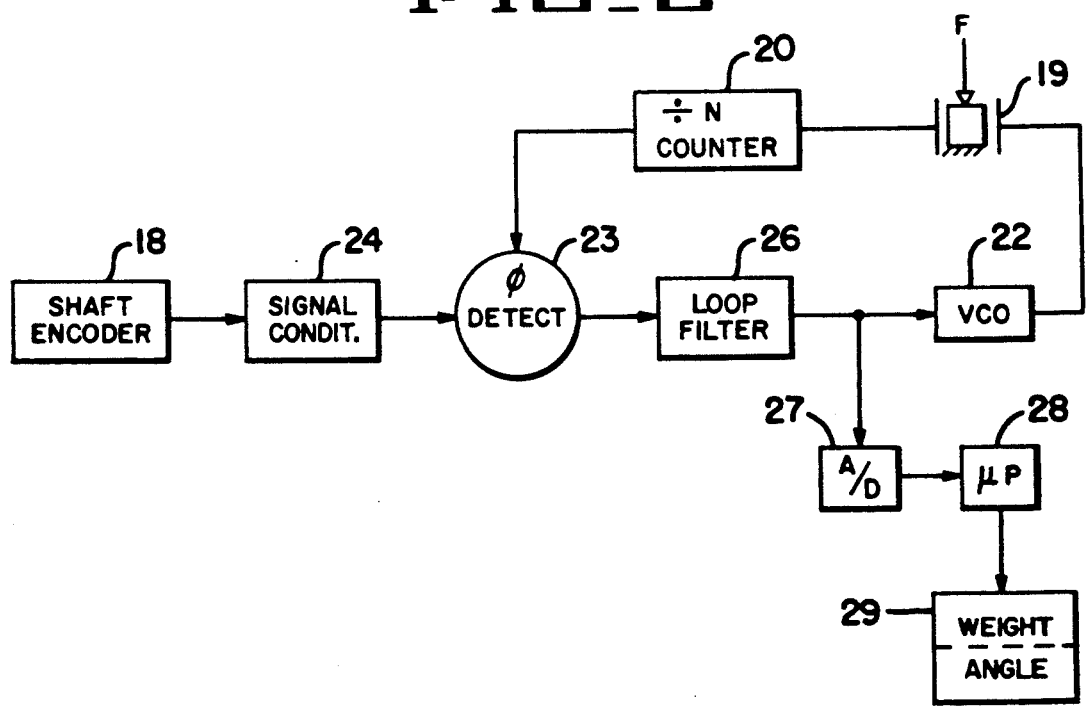

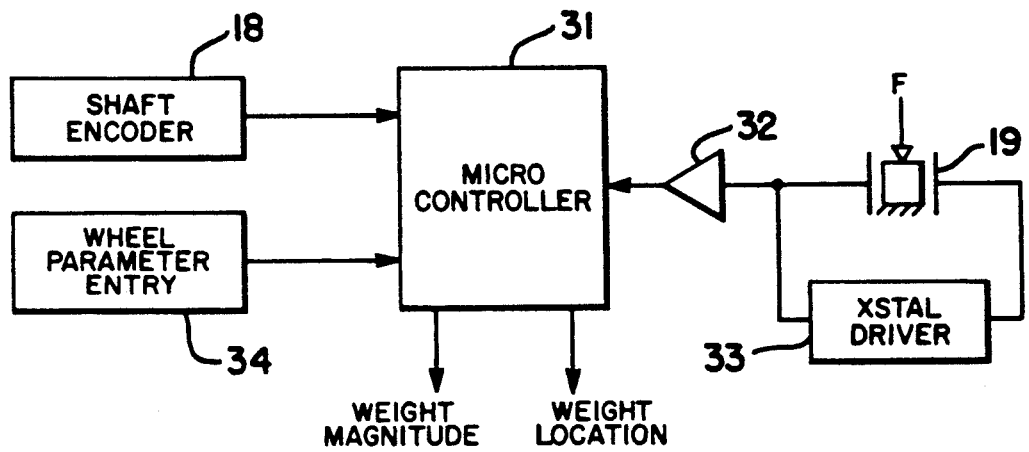
FIG_3
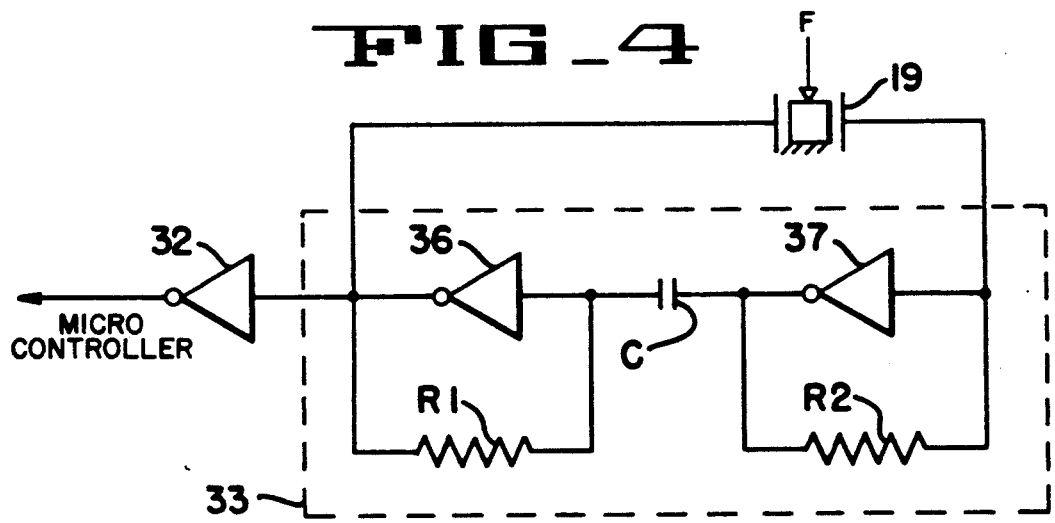
FIG_4

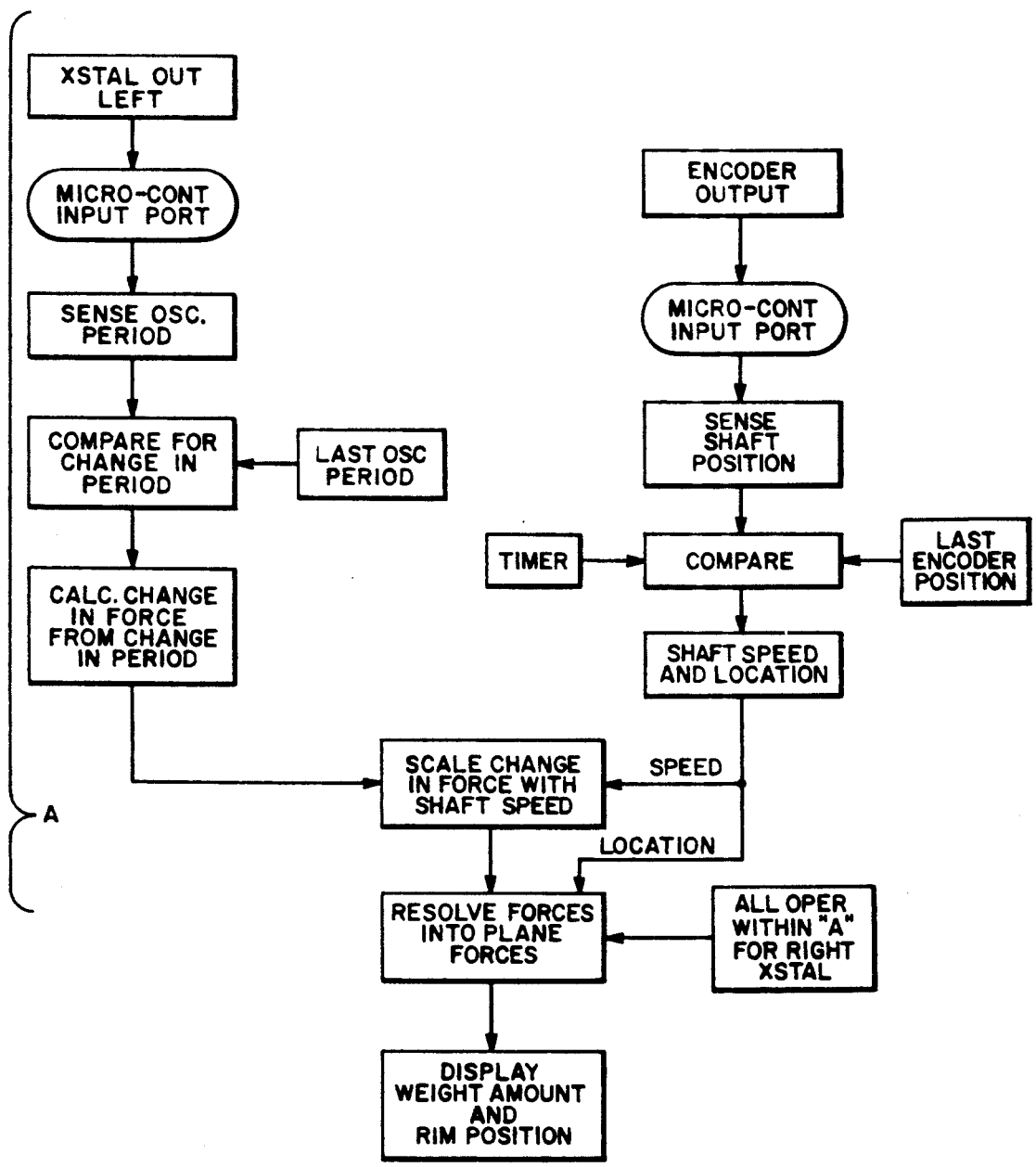
FIG_5

APPARATUS AND METHOD FOR SENSING UNBALANCE FORCE AND LOCATION THROUGH FREQUENCY MODULATION

SUMMARY OF THE INVENTION

A force sensing system for sensing unbalance forces at a spin shaft configured for mounting tire and rim assemblies in a wheel balancing machine comprises means for sensing the shaft angular position and for providing a shaft position output signal together with a piezo electric crystal mounted in the wheel balancer adjacent the shaft and exposed to the unbalance forces. Means is included for exciting the piezo electric crystal whereby a crystal frequency output signal is provided. The system also includes means for comparing the shaft position and frequency output signal and for providing a comparison output related thereto, the comparison output being connected to the means for exciting. As a result the crystal frequency output is stabilized relative to the shaft position signal. Further, means is provided for receiving the comparison output signal and for extracting the tire and rim assembly unbalance position and magnitude information therefrom.

An unbalance force detection system for sensing unbalance force location and magnitude in a vehicle tire and rim assembly mounted on a rotatably spin shaft is disclosed which comprises means for providing a shaft spin signal indicative of shaft angular position and speed together with force sensing means mounted to sense the force imposed on the rotatable spin shaft by vehicle tire and rim assembly unbalance. A force signal is provided by the force sensing means having a frequency indicative of unbalance force magnitude. Means is also provided for comparing the shaft spin and force signals and for providing an unbalance signal containing unbalance force phase and magnitude information at the rotatably spin shaft. Further, means is provided for processing the unbalance signal to provide indicative of unbalance force and spin shaft referenced angular location.

The method of sensing unbalance force magnitude and location in a vehicle tire and rim assembly mounted on a spin shaft supported in a wheel balancer, and having an encoder providing a frequency output indicative of the shaft angular position and speed and a piezo electric crystal force sensor mounted to sense unbalance force at the shaft, includes the steps of exciting the piezo electric crystal to oscillate at a predetermined frequency in the absence of unbalance forces, comparing the encoder frequency output with the crystal frequency, generating a balancer output from the encoder frequency and crystal frequency comparison, whereby unbalance force imposed crystal oscillations provide balancer output variations, and processing the balancer output to obtain unbalance magnitude and angular location information.

The disclosed invention relates to an unbalance force detection system for a vehicle tire and rim assembly mounted on a rotatable spin shaft for providing magnitude and location of unbalance compensation mass to be applied to the tire and rim assembly and includes means for providing a shaft spin signal indicative of shaft angular position and speed, force sensing means mounted to sense unbalance force imposed on the rotatable spin shaft by the vehicle tire and rim assembly rotating thereon and providing a frequency output indicative of the unbalance force, and means for detecting the unbalance force frequency output and for converting it to unbalance force and location outputs corresponding thereto. Also included is means for processing the unbalance force and location outputs to provide indicative of unbalance compensation mass and spin shaft referenced weight application location.

DESCRIPTION OF THE DRAWINGS

FIG. 1 is a diagrammatic depiction of a wheel balancer of the type which utilizes the disclosed invention.

FIG. 2 is a block diagram of one embodiment of the present invention.

FIG. 3 is a block diagram of another embodiment of the present invention.

FIG. 4 is a schematic diagram of a preferred form of the crystal driver of FIG. 3.

FIG. 5 is a flow chart relating to the embodiment of FIG. 3.

BRIEF DESCRIPTION OF THE PREFERRED EMBODIMENTS

A typical wheel balancer for vehicle rim and tire assemblies is disclosed in U.S. Pat. No. 4,285,240 issued to Gold in August, 1981 and reissued in August, 1985 as Re 31,971 by the U.S. Patent Office. An abbreviated description of a wheel balancer of the type disclosed therein with which the invention disclosed herein may be used is made with reference to FIG. 1 of the drawings. The wheel balancer comprises a base 11 on which is mounted a drive motor 12 having a pulley 13 mounted on a driven shaft extending therefrom. A drive belt 14 surrounds the pulley 13 as well as a driven pulley 16 which is mounted to rotate with a spin shaft 17. The pulley 16 and shaft 17 rotate relative to the balancer base 11. The spin shaft has mounted at one end thereof a shaft encoder 18 which may be of the optical type as described in U.S. Reissue Pat. No. 31,971 referenced herein. The encoder provides a frequency indicative of the angular speed of shaft 17 together with information relating to instantaneous shaft angular position. Mounted between the base 11 of the wheel balancer and the shaft 17 are a pair of piezo electric crystals 19 spaced along the length of the spin shaft. Structure is provided on the end of the spin shaft opposite the end on which the encoder 18 is mounted for mounting a vehicle tire and rim assembly 21. The motor 12 drives shaft 17 with the tire and rim assembly 21 mounted thereon and the rotating unbalance force in the tire and rim assembly is sensed as it rotates and passes through the angular positions occupied by the unbalance force sensors 19. It should be noted that the wheel balancer with which the invention disclosed herein may be used to advantage need not be driven by a drive motor 12, but may be driven by any other drive means including manual means.

The characteristic of a piezo electric crystal transducer is to produce voltage when a force is applied tp it. On the other hand, if the crystal is excited by an alternating voltage it will oscillate over a wide range of frequencies depending upon the excitation frequency. When the crystal is caused to oscillate at a particular frequency by applying a particular excitation thereto, the rate of oscillation will change in response to application of a force change to the crystal. Therefore, if the crystal 19 is stimulated to oscillate, an unbalance force resulting from spinning a tire and rim assembly which is spun on a wheel balancer, such as that described in connection with FIG. 1, will change the frequency of oscillation of the crystal. The frequency change will be proportional to the change in the amount of force applied to the crystal or the unbalance in the tire and rim assembly.

Since the change of frequency of the oscillation of an excited piezoelectric crystal is proportional to the change of force applied thereto, it can be said that the frequency of oscillations in the crystal is modulated by the applied force. In this case the applied force is the unbalance force exerted by the rotating tire and rim assembly mounted on shaft 17 of the wheel balancer of FIG. 1. The apparatus and method disclosed herein for detecting unbalance force will be seen to be comparatively much more immune to noise disturbance, because there are no high Q requirements for a noise reduction filter which receives the unbalance information signal produced by the system of this disclosed invention, as is the case when using the force sensor to generate an analog voltage indicative of unbalance force magnitude and phase.

FIG. 2 depicts the shaft encoder 18 providing a shaft rotational frequency output as well as a shaft angular position or phase output. The piezo electric transducer 19 in FIG. 2 is excited by the output from a voltage controlled oscillator (VCO) 22 to oscillate at a predetermined frequency with no unbalance force applied thereto. Generally there is a constant preload force F applied to the crystal. The output frequency from the piezo electric crystal is provided to a divide by N counter 20 which provides an output of a desired frequency to a phase detector 23.

The shaft encoder output is conditioned in a signal conditioner 24 so that it assumes the aforementioned desired frequency as well as amplitude and may be used with the divided piezo electric crystal output. Thus, the conditioned shaft encoder output from signal conditioner 24 and the conditioned piezo electric crystal output frequency from the divide by N counter 20 are provided to the phase detector 23 which will provide an output therefrom (as described in FIG. 2) which is proportional to the difference in phase, resulting from difference in frequency, between the two input signals. The signal arising from the difference in phase between the conditioned piezo electric crystal frequency and the conditioned shaft encoder frequency is connected to a low pass loop filter 26 so that the VCO 22 is not driven to try to correct for high frequency noise signals provided by the broad band sensitivity of the crystal 19. Typically, the loop filter 26 is a 100 cycle low pass filter. This filtered output if an analog signal which is connected to the input of the VCO 22 and which contains the unbalance force magnitude and phase or angular location information.

As may be seen from the foregoing description, FIG. 2 shows a phase locked loop circuit which allows the unbalance signal phase information to be maintained and gives rise to an inherently stable oscillator. The phase locked loop controls the oscillation frequency of the crystal 19, keeping it locked to the reference signal, the conditioned shaft encoder output from signal conditioner 24. This allows the unbalance force signal to be referenced to the known phase of the encoder in order to calculate the unbalance correction weight angular location. The voltage controlled oscillator 22 utilizes the output signal from the loop filter 26 to adjust the piezo electric crystal to oscillation frequency of the piezo electric crystal to keep it in phase with the reference signal from signal conditioner 24. The unbalance force signal output from the loop filter 26 may be connected to an analog to digital converter 27 and analyzed with a computer or microprocessor 28 to derive the correction weight magnitude and phase or angular location relative to the encoder output. Force scaling will be described hereinafter in conjunction with the description of the embodiment of FIGS. 3–5. The correction or compensation weight magnitude and angular location are then communicated to an operator by means such as the display 29 shown in FIG. 2.

An alternative embodiment of the disclosed invention may be seen with reference to FIG. 3. A micro controller 31 such as a SAB80C535, manufactured by Siemens Components, Inc., of Orange, Calif., is connected to receive input from the shaft encoder 18. The micro-controller is also connected to receive input from a buffer 32 connected between the oscillating crystal 19 and the micro controller. A crystal driver 33 is set to provide a known frequency output when there is not unbalance load being measured. The piezoelectric crystal may be preloaded with a force F. A change in unbalance force F applied to the force sensing piezoelectric crystal transducer 19 will cause a change in frequency output from the transducer. The micro controller receives the new frequency from crystal transducer 19 through buffer 32 and converts it to force and location of the changed unbalance. Wheel parameter entry structure 34 is provided to allow the unbalance force and location to be converted to accommodate the specific rim and tire assembly 21 mounted on the wheel balancer.

A preferred embodiment of the crystal driver 33 is shown in FIG. 4. An oscillating circuit is connected as shown having a pair of inverters 36 and 37 having feedback resistors R1 and R2. The inverters may be 74LS04 Hex inverters manufactured by Motorola, Texas Instruments and others. The buffer may be the same type of inverter. A capacitor C is shown connected between the output of inverter 37 and the input of inverter 36. This capacitor is selected to tune the combination of the crystal driver 33 and the crystal transducer 19 of FIG. 4 to some appropriate frequency such as 40 KHz. From the foregoing it may be seen that the frequency output from the force transducer 19 is allowed to change and the new frequency together with information from encoder 18 is converted by the micro controller to an unbalance force and location.

Turning to FIG. 5, a flow chart of the manner in which the left crystal transducer output together with the encoder output is processed is shown. It should be noted that the right crystal of the usual pair of transducer in a wheel balancer is treated in the same way. As seen by "A" in FIG. 5 and the box stating "all operations within "A" are preformed for the right crystal" the process is the same for the right crystal and the resulting signals are used as input to resolve forces into plane forces. Therefore, the processing relating to the left transducer only will be explained, it being understood that the process for the right transducer is the same.

The left transducer output is connected to an input port of the micro controller 31 as stated hereinbefore. The micro controller senses the oscillation period of the frequency output from the transducer. The sensed frequency period is compared with the last frequency period to detect any change. The change is converted to a force change by calculation.

The encoder output is also input to an input port of micro controller 31, or 28 in the embodiment of FIG. 2.

Shaft position is sensed. The position is compared with a last sensed encoder position and shaft speed and angular location are calculated. The shaft speed is used to scale the converted or measured force change. The scaled force and shaft location are input to that section of the controller which resolves the forces into forces in the selected wheel assembly planes. Thereafter the unbalance compensation weight amounts and rim weight application locations are indicated to an operator, as by a display. It may be seen that in this embodiment the crystal transducer is allowed to put out the frequency in accordance with the unbalance force applied and that the system operates on that frequency to extract the force magnitude.

Although the best mode contemplated for carrying out the present invention has been herein shown and described it will be apparent that modification and variation may be made without departing from what is regarded to be the subject matter of the invention.

What is claimed is:

1. A force sensing system for sensing unbalance forces at a spin shaft configured for mounting tire and rim assemblies in a wheel balancing machine, comprising means for sensing the shaft angular position and for providing a shaft position output signal, a piezo electric crystal mounted in the wheel balancer adjacent said shaft exposed to the unbalance forces, means for exciting said piezo electric crystal whereby a crystal frequency output signal is provided, means for comparing said shaft position and frequency output signals and for providing a comparison output related thereto, means for comparing said shaft position and frequency output signals and for providing a comparison output related thereto, said comparison output being connected to said means for exciting so that said crystal frequency output is stabilized relative to said shaft position signal, and means for receiving said comparison output signal and for extracting tire and rim assembly unbalance position and magnitude information therefrom.

2. A force sensing system as in claim 1 comprising means for conditioning said shaft position output signal to provide phase and frequency indicative of spin shaft angular position and speed, means for conditioning said crystal frequency output to obtain a predetermined frequency relationship with said shaft position conditioned output when no unbalance force is present, said means for comparing comprising a phase detector.

3. A force sensing system as in claim 1 comprising a filter connected to receive said comparison output signal whereby noise signals are removed therefrom.

4. A force sensing system as in claim 3 wherein said filter is a low pass filter.

5. An unbalance force detection system for sensing unbalance force location and magnitude in a vehicle tire and rim assembly mounted on a rotatably spin shaft, comprising means for providing a shaft spin signal frequency indicative of shaft angular position and speed, force sensing means mounted to sense force imposed on the rotatably spin shaft by vehicle tire and rim assembly unbalance and providing a force signal having a frequency indicative of unbalance force magnitude;

means for comparing said shaft spin signal and force signal frequencies and for providing an unbalance signal containing unbalance force magnitude at the rotatable spin shaft; and means for processing said unbalance signal and said shaft spin signal frequency to provide indication of unbalance compensation weight size and spin shaft referenced weight application location.

6. An unbalance force detection system as in claim 5 comprising first and second signal conditioning means for said shaft spin and force signal frequencies, so that said means for comparing compares the phases thereof.

7. An unbalance force detection system as in claim 5 wherein said force sensing means comprises a voltage controlled oscillator connected to receive said unbalance signal and to provide an oscillator output, and a piezo electric crystal connected to receive said oscillator output.

8. An unbalance force detection system as in claim 5 wherein said unbalance signal comprises an analog unbalance signal, further comprising analog to digital conversion means receiving said analog unbalance signal and providing a digital unbalance signal, and processor means for receiving said digital unbalance signal and for providing output indicative of discrete weight and wheel rim angular location for counterbalancing the sensed unbalance in the vehicle tire and rim assembly.

9. An unbalance force detection system as in claim 5 wherein said force sensing means comprises a piezo electric crystal and means for exciting said crystal to oscillate at a predetermined frequency.

10. An unbalance force detection system as in claim 5 comprising a low pass filter wherein said unbalance signal is connected to the input of said low pass filter, whereby spurious high frequency signals sensed by said piezoelectric crystal are removed from said unbalance signal.

11. An unbalance detection system as in claim 5 wherein said means for comparing comprises a phase detector.

12. An unbalance detection system as in claim 5 wherein said means for comparing comprises means for scaling sensed force with shaft speed.

13. A method of sensing unbalance force magnitude and location in a vehicle tire and rim assembly mounted on a balancer having a spin shaft mounted therein, an encoder providing a frequency output indicative of shaft angular position and speed, and a piezoelectric crystal force sensor mounted to sense unbalance force at the shaft, comprising the steps of exciting the piezoelectric crystal to provide crystal oscillation output at a predetermined frequency in the absence of unbalance forces, comparing the encoder frequency output with the crystal oscillation frequency output, generating a balancer output from the frequency comparison, whereby unbalance force imposed crystal frequency variations provide balancer output variations, and processing the balancer output to obtain unbalance magnitude and angular location information.

14. The method of claim 13 comprising the step of conditioning the encoder frequency output and the piezoelectric crystal oscillation frequency output, wherein the step of comparing comprises the step of detecting the difference between the encoder frequency and the crystal oscillation output.

15. The method of claim 13 comprising the step of filtering the balancer output to remove high frequency noise output produced by the broad band sensitivity of the piezoelectric crystal.

16. The method of claim 13 wherein the step of comparing the encoder frequency output with the crystal oscillation output comprises the step of scaling the unbalance force induced crystal oscillation with the spin shaft speed.

17. An unbalance force detection system for a vehicle tire and rim assembly mounted on a rotatable spin shaft for providing the magnitude and location of unbalance compensation mass to be applied to the tire and rim assembly, comprising
    means for providing a shaft spin signal indicative of shaft angular position and speed,
    force sensing means mounted to sense unbalance force imposed on the rotatable spin shaft by the vehicle tire and rim assembly rotating thereon,
    means for driving said force sensing means to oscillate at an appropriate predetermined frequency in the absence of sensed unbalance force and providing a frequency output wherein said frequency is indicative of the unbalance force,
    means receiving said shaft spin signal and said frequency output for detecting change in frequency output and for converting said output to unbalance force and location outputs corresponding thereto, and
    means for processing said unbalance force output and location outputs to provide indication of unbalance compensation mass and spin shaft reference weight application location.

18. The unbalance force detection system of claim 17 wherein said force sensing means comprises an oscillating crystal and an oscillatory crystal driving circuit connected thereto.

19. The unbalance force detection system of claim 17 wherein said means for processing comprises means for scaling said detected unbalance force with shaft angular speed.

* * * * *